(12) United States Patent
Mason

(10) Patent No.: US 7,520,748 B2
(45) Date of Patent: Apr. 21, 2009

(54) MODELLING TERRAIN IMPROVEMENTS

(76) Inventor: James Peter Mason, 27 Howard Lane, Mount Barker, South Australia 5251 (AU)

( * ) Notice: Subject to any disclaimer, the term of this patent is extended or adjusted under 35 U.S.C. 154(b) by 167 days.

(21) Appl. No.: 10/549,497

(22) PCT Filed: Mar. 17, 2004

(86) PCT No.: PCT/AU2004/000318

§ 371 (c)(1),
(2), (4) Date: Sep. 19, 2005

(87) PCT Pub. No.: WO2004/084157

PCT Pub. Date: Sep. 30, 2004

(65) Prior Publication Data

US 2006/0257829 A1    Nov. 16, 2006

(30) Foreign Application Priority Data

Mar. 17, 2003  (AU) ............................ 2003901195

(51) Int. Cl.
*G09B 27/08* (2006.01)

(52) U.S. Cl. ............................................. 434/152

(58) Field of Classification Search .............. 434/130, 434/131, 132, 150, 152, 135
See application file for complete search history.

(56) References Cited

U.S. PATENT DOCUMENTS

| | | | |
|---|---|---|---|
| 2,185,689 A * | 1/1940 | Jensen | 434/152 |
| 2,185,924 A * | 1/1940 | Pereira | 264/257 |
| 3,487,133 A * | 12/1969 | Lindsay | 264/40.1 |
| 3,533,812 A * | 10/1970 | Cummings et al. | 501/144 |
| 3,634,951 A * | 1/1972 | Knoll | 434/152 |
| 3,742,620 A * | 7/1973 | Knoll | 434/152 |
| 4,192,083 A * | 3/1980 | Rebbeck | 434/72 |
| 4,685,884 A * | 8/1987 | Rohan | 434/152 |
| 5,326,267 A * | 7/1994 | Brokaw | 434/151 |
| 5,427,530 A * | 6/1995 | Taggart | 434/276 |
| 5,672,059 A * | 9/1997 | Browne-Wilkinson | 434/274 |
| 5,676,550 A * | 10/1997 | Giamportone et al. | 434/132 |
| 5,686,154 A * | 11/1997 | Brown, Jr. | 428/15 |
| 5,951,301 A * | 9/1999 | Younker | 434/272 |
| 6,291,536 B1 | 9/2001 | Taylor | |
| 6,923,654 B2 * | 8/2005 | Johnson | 434/295 |

FOREIGN PATENT DOCUMENTS

| | | |
|---|---|---|
| FR | 2 754 928 A | 4/1998 |
| GB | 2 239 611 A | 7/1991 |
| JP | A-58-151366 | 9/1983 |
| WO | WO 00/65962 A1 | 11/2000 |

OTHER PUBLICATIONS

"Casting Plasticine", Oct. 2001 [retrieved online Jun. 21, 2007].*
"Tim Vittetoe Originals: GM Foam Facts", 1998 [retrieved online Jun. 21, 2007].*
Mask Makers' Paradise by Special Effect Supply Corp., May 1996 [retrieved online Jun. 21, 2007].*

* cited by examiner

*Primary Examiner*—Kurt Fernstrom
(74) *Attorney, Agent, or Firm*—Oliff & Berridge, PLC

(57) ABSTRACT

A terrain model element and method of manufacture which has a latex shaped layer molded in a drying mold and supported by a flexible foamed plastics material. In one instance the foamed plastics is molded directly into the latex layer.

22 Claims, 6 Drawing Sheets

MODELLING TERRAIN IMPROVEMENTS

TECHNICAL FIELD

This invention relates to modelling terrain.

BACKGROUND ART

Modellers use terrain units to create the three-dimensional visually appealing terrain in combination with models for various purposes such as, for instance, playing war games or incidental scenery for a model railway and the like.

Conventionally this terrain is provided by individual units being placed together on a supporting surface so that they fit in an adjacent relationship to provide a continuity across a selected area.

Several of the problems which are being addressed by this invention will now be discussed.

A current constructional method uses a polystyrene base with an upper form provided by a resin.

Difficulties relate to this current method insofar that the units are, because of their character, vulnerable to damage including having any painted surface chipping or even edges of the styrene being broken.

A further problem is that the current materials make up units which are in comparative terms quite heavy. This is of concern where, for instance, a modeller may be competing in a competition where the terrain must be carried to the competition location by the modeller. In the making of terrain modules, it is exceedingly difficult to achieve answers to a combination of challenges.

Some materials which have been used in the past and to some extant are still being used by some currently, such as styrene and resin, exhibit vulnerability to being easily broken and damaged, for instance by not providing a sufficient adhering surface for coatings such as paints or flocks.

Another problem is the physical all up weight that might result from the use of specific materials. This is of concern when the terrain models might be being used by war garners who may need to transport their modules to different locations either within a country or of course internationally.

Further, them is great attraction in having the ability to have complex shapes which add to interest in the terrain itself by others but hitherto, there are some limits purely based upon available manufacturing techniques which can be provided at an economic level.

Latex has been found to provide a useful upper layer providing a form onto which colouring materials and surface finishes can be applied, but it is a material that has enormous complexities and these complexities have hitherto made it either very difficult, or for some impossible, to use as an upper layer material for terrain models.

OBJECT OF THIS INVENTION

It is an object of this invention to reduce at least one or more of the above problems.

DISCLOSURE OF THE INVENTION

In one form of this invention, there is proposed a terrain model element which includes a base of a foamed plastics malarial having adhered on an upper face a shaped layer providing the modelling terrain shape which is comprised of latex.

In preference, the base is sheet-like.

In preference, the foamed plastics material is a flexible foam.

In preference, the plastics foam material adheres to the late by reason of being directly molded into the latex layer.

In preference, the latex layer is molded so as to be within the range of thickness, at least substantially through the extent of the layer of between 1 millimeter and 10 millimeters.

In preference, the foamed plastics fills or substantially fills the otherwise open cavity shape of an underneath surface of a latex upper layer.

In preference, the upper modelling layer of latex is formed so that it includes parts that are adhering to an upper surface of the base material and other parts of which are hollow and which therefore have a lowermost surface which is above and separate from an uppermost surface of the base material.

This accordingly leaves a hollow area which in practice has some advantage especially since it implicitly keeps the weight of the unit low and it has been found to still provide an adequate shaping in practice and to allow a higher degree of flexibility of the shape which makes this potentially less vulnerable to impact and therefore wear and other damage.

One of the problems with latex however where this is a material that can be either sprayed or brushed on to the inside of a mould so that its shape is formed as a thin layer, is that as the material cures, it is especially vulnerable to contraction in one direction as compared to any transverse direction.

It is fairly obvious therefore that this will cause difficulties with terrains in terms of joining units together so that there is a continuity of the shape.

As the actual unilateral direction of contraction may not always be able to be accurately predicted, this makes it even worse for predicting the end result, subsequent to casting this material, and especially where the purpose of the production is for mass production purposes.

We have discovered that there is an advantage during the application and initial curing stage by having at least a surface of the mould such that it will adsorb moisture from the applied latex.

In preference, such absorption can be achieved by using a material such as Plaster of Paris, which is implicitly porous and in practice absorbs a significant amount of water.

My discovery is that tis technique then of providing a mould of this absorbent material assists in reducing differential contraction of the curing latex material and therefore provides for more reliability in achieving an end shape that will be of consistent size and shape subsequent to an initial curing and stripping from the mould stage.

A further difficulty in relation to previous modelling units is that the shaping form of resin that will be painted, over time, is found to lose adhesion.

Accordingly, conventional paint which is applied to resin after a period becomes chipped and breaks away, so that continual reapplication of paint or a reduction in the quality of the terrain results.

A further discovery has been that with latex, most acrylic paints can be applied and will adhere initially "well" but, surprisingly, over time, thy become even more integrated with the latex so that after a significant period of time, I have discovered that the latex self can be stretched with e paint and with an appropriate selection of paint, the paint itself will stretch with the latex without breaking away or without showing any separation of the paint layer itself.

This then is of significant advantage in this business.

In preference, the base unit is made from a foamed plastic and, in this case, from a urethane foam which I have found can be adhered effectively to a latex upper layer.

Our discovery has been that a self-adhesive material can be provided and sheets of polyurethane foam with such a self-adhesive upper surface can be purchased commercially in this form.

Reference has been made to terrain units and it is intended in this invention that the shape of such units shall be such that in plan they will provide for joining with other units to provide some form of continuous terrain shape.

This will then implicitly presume that the thickness at adjoining or adjacent edges are relatively matched, which is to say that the height above a supporting surface level will be the same in respect of such adjacent units or units that are expected to be adjacent. Various plan shapes can be used. For instance, they can be a regular hexagon, a square, or a triangle, as typical instances.

A typical thickness of the sheet might be twenty millimeters, although at least within the form there can be some change of thickness and to illustrate, it might have a step up to forty millimeters or even fifty millimeters in some case. Again, as a typical illustration, that also with the consideration in mind that if these are to be placed on a common planar surface in an adjacent vicinity, the terrain is expected to be matching and therefore the relative height above the supporting surface would be normally consistent.

This is not to say that there should not be tailor-made variations from this where a particular effect is to be achieved.

The latex layer itself might be two or three or more millimeters in thickness as a separate sheet having, however, this characteristic that in parts, it is separated and therefore leaves a void or hollows beneath the sheet or thin layer of latex as compared to the underneath base material.

The actual thickness of the latex sheet itself is not found to be especially critical as it is formed by brushing or spraying onto a receiving model surface so that such thickness can vary from application to application. However, it is conventionally very much thinner than the base of supporting material.

BRIEF DESCRIPTION OF THE DRAWINGS

For a better understanding of this invention it will described with reference to drawings wherein.

BEST MODE FOR CARRYING OUT THE INVENTION

Figure 1:
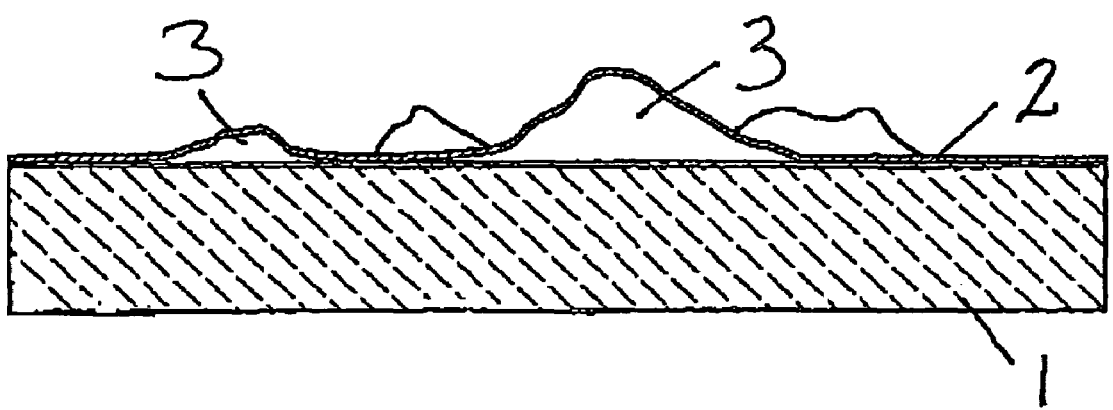
FIG. 1 there is a cross section through a unit.
Figure 2:
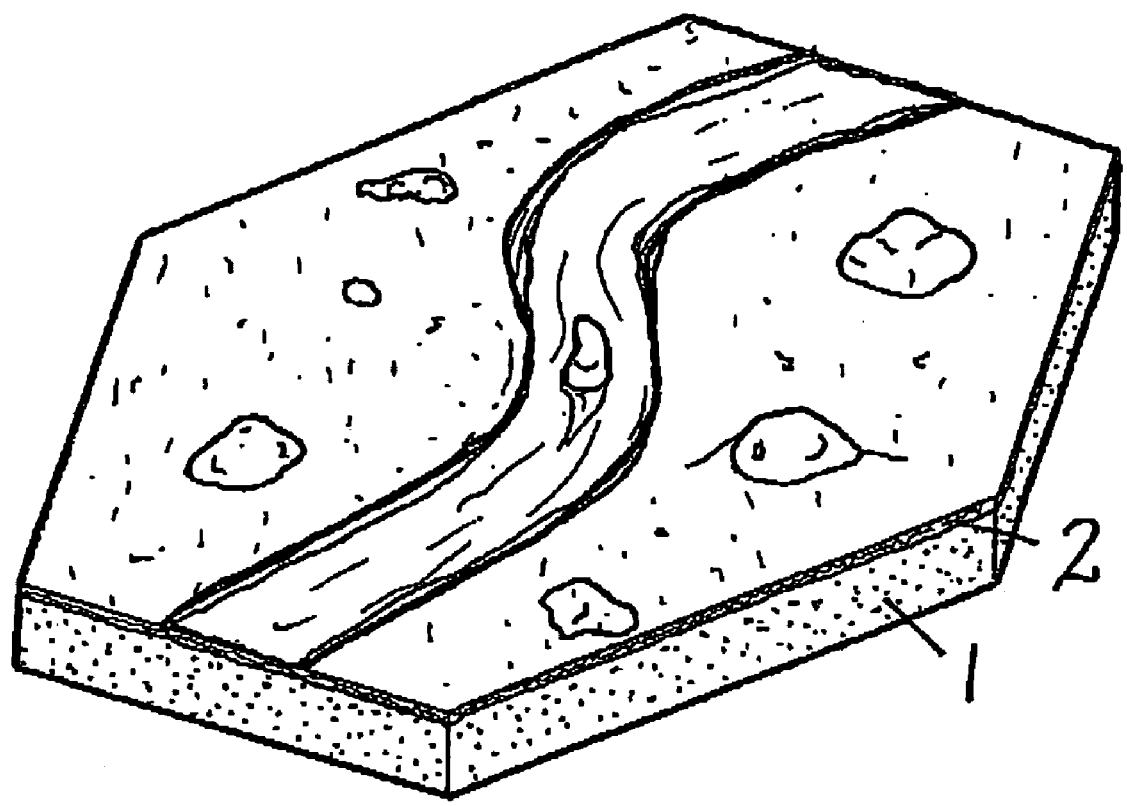
FIG. 2 is a perspective view of a single hexagonal void.
Figure 3:
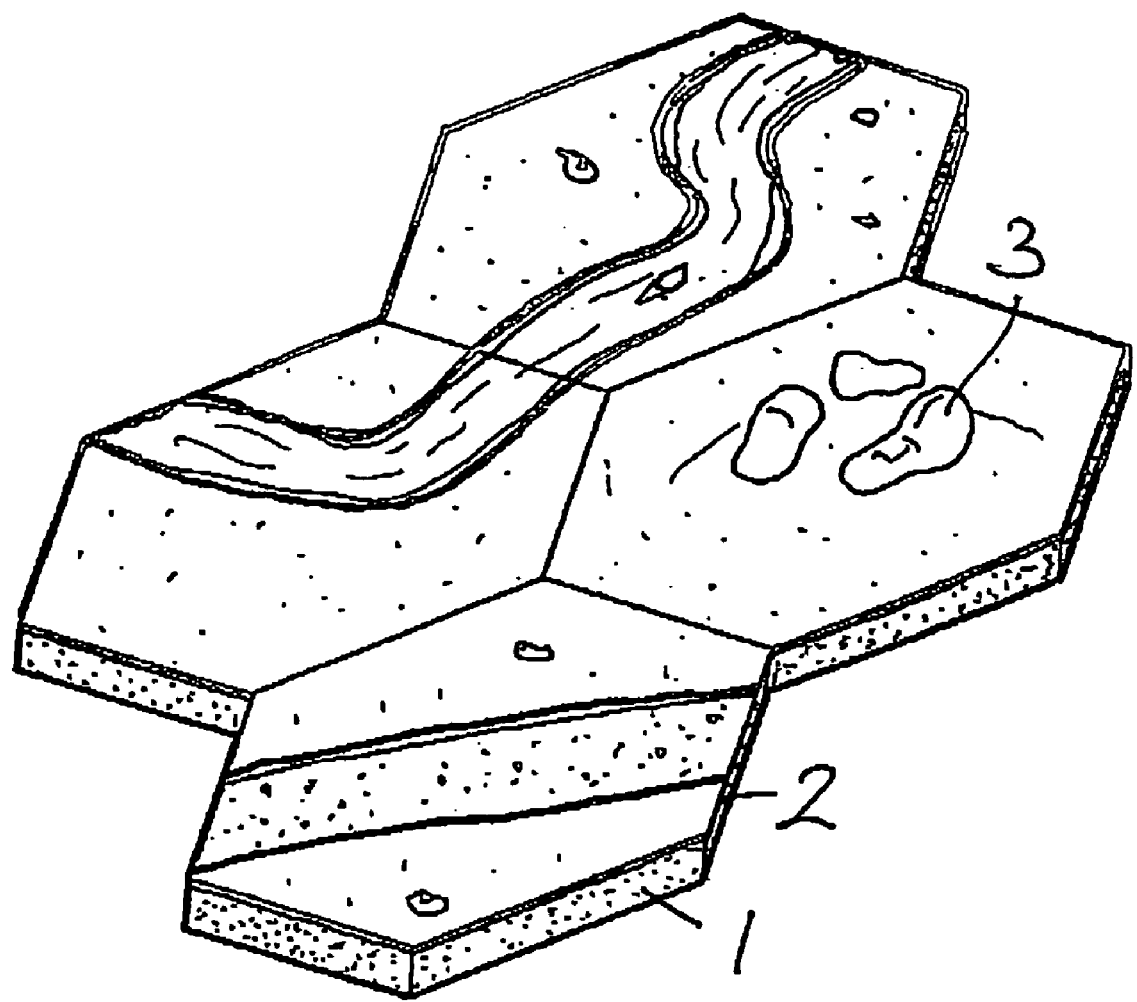
FIG. 3 shows a perspective view of a number of units located as they would be to provide a continuity of scene.
Figure 4:
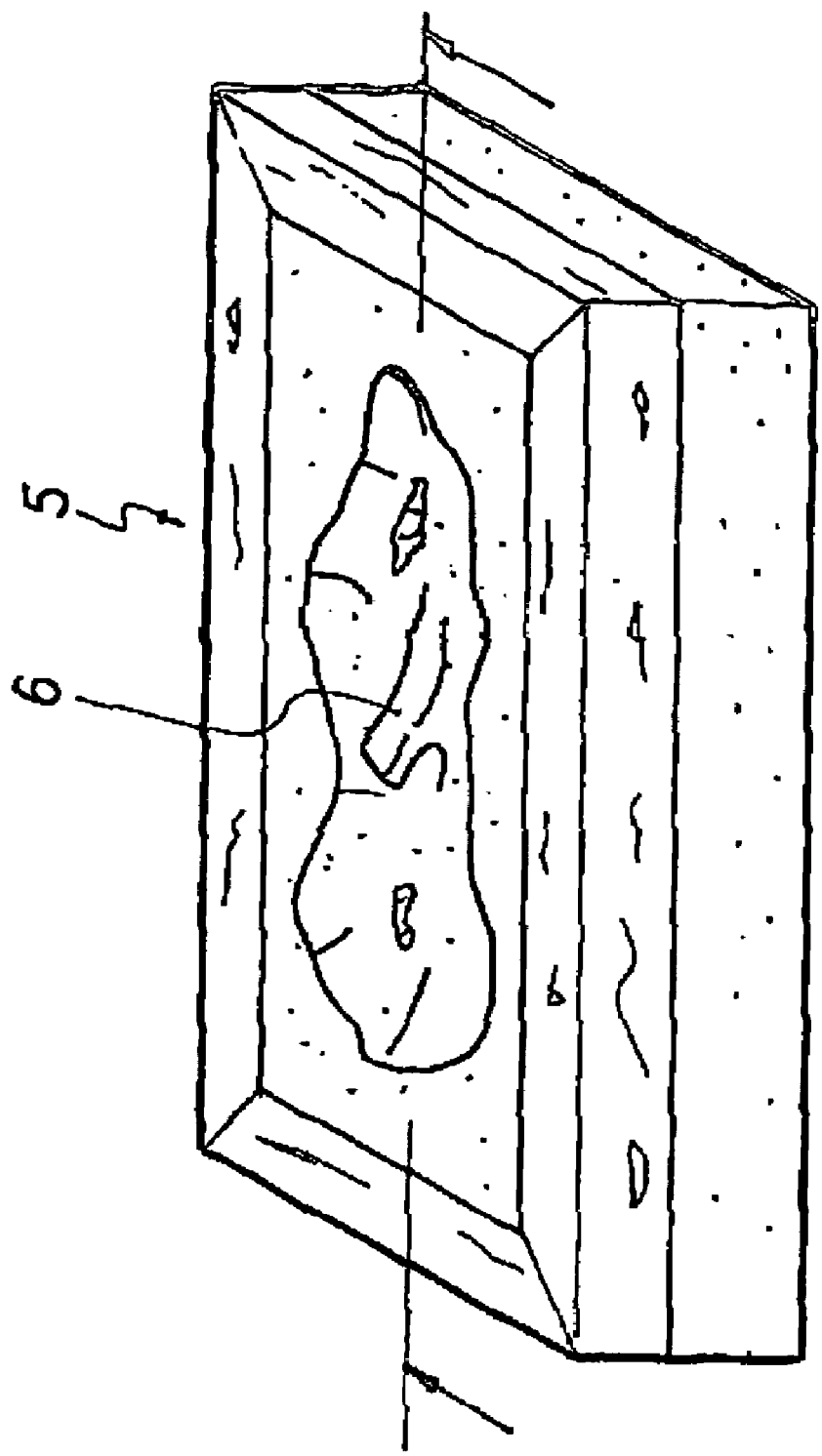
FIG. 4 is a perspective illustration of a mold for manufacture of an upper latex layer for a second embodiment.
Figure 5:
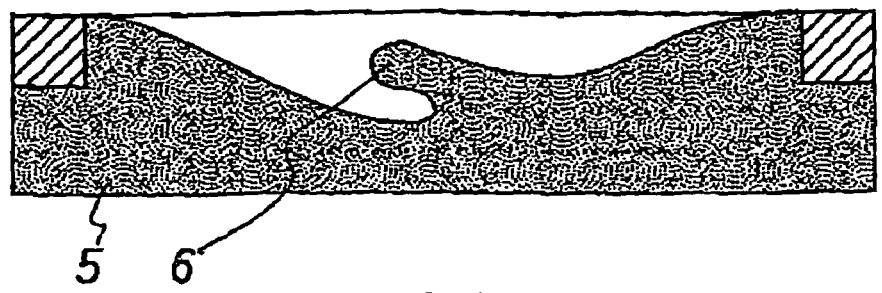
FIG. 5 is a cross-sectional view through the mold in FIG. 4.

Shown in the drawings then is a base unit showing a hexagonal plan shape, which is of regular hexagonal shape such that this can fit with adjacent units as shown in FIG. 3, and has a form that will generally match both in terms of continuity of shape and height such adjacent units.

The base 1, is made from polyurethane foam of normal thickness and there is a latex surface 2 which is adhering across a top of this underneath base 1.

There are parts within the latex that lies above a base level and leave a void as shown in 3.

In order to get to the shape shown, the latex is purchased as a liquid appropriate for brushing or spraying (it can be either type of material) and this is laid as a thin layer on to the Inside surface of a mould made preceding this from Plaster of Paris.

The Plaster of Paris is such that it will be porous and has the advantage that this ability to absorb the moisture appears to restrict differential contraction during the curing of the latex. Once an adequate curing stage has been reached, the latex is stripped from the mould and is then applied from a base unit as is shown in 1, which has a planar upper surface with a self-adhesive coating appropriate to adhere the latex to the upper surface of the base material.

The foam from which the base is made is a flexible polyurethane foam which has the significant advantage of being very robust in being handled, firstly, because it is flexible and secondly, it can be bent even grossly without causing damage, as contradiction to rigid foam.

The advantage of having the latex layer, as has been previously stated, is that this then will receive acrylic paints (and this applies to most acrylic paints that we have tried) which thereby adhere and seem to increase their adhesion over time to the stage where, after a year or so, in our experience, the stretching of the latex will result only in the paint surface itself also stretching with the surface without breaking or fracturing away.

Now referring to the second embodiment this is different to the first insofar that an upper latex layer is formed which has a foamed plastics molded and foamed directly on to the back or lower surface of the upper latex layer.

The discovery in the first instance has been that such a material is now commercially available and further, provides adequate adhesion during the molding process to the underneath latex surface.

The relevance of it being flexible is twofold.

A first difficulty with the manufacture of terrains is to make them interesting, and this effect is assisted dramatically by having potential for undercutting shapes and especially deeply undercutting shapes, for instance shapes that can simulate caves, even deep caves, tunnels or even the more straightforward shapes such as trees and in many cases buildings.

It can be well imagined that by being able to provide under it can provide a designer with many more opportunities for interesting forms and shapes.

Hitherto then, if a traditional rigid foam was used, while it may be able to provide adequate support and to some extent infill into cavities, in a practical sense, it becomes either very difficult or in an economic sense, impossible in the particular market for there to be likewise included undercutting shapes.

However, by using flexible foam, and understanding that latex itself once dried is both modestly elastic and also deformable, then such a filled latex shape where the filling is flexible foam, allows for the material then to be extracted from what can be quite complex and intrusive mold shapes, which can therefore include features such as caves, or be built quite high (2 to 3 feet for instance) in places for the purpose of modelling mountainous terrain or the like.

Further, because the foam plastic itself can be caused to infill substantially into perhaps complex shapes and provide these with substantial internal support, the whole unit itself then is strengthened internally and what this means is that you do not need as a separate base thickness, a thick separate element.

This then provides advantage both in overall cost of materials, all up weight of a module, and for these and other reasons as well, a reduction in the complexity of manufacture.

Looking at the drawings for the second embodiment then, there is a mold 5 which is formed from Plaster of Paris so that it has a porous and therefore water absorbent surface.

There is shown in this mold, at least one undercut portion which will be useful to indicate a cave in the eventual product, this being shown as 6.

Latex is a natural product being the sap of rubber trees and the curing process is achieved simply by drying this.

Figure 6:
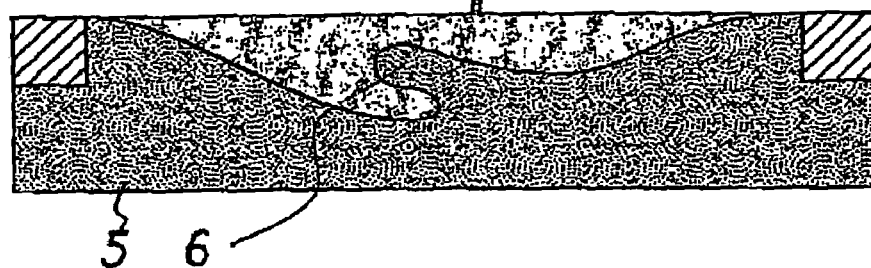
FIG. 6 illustrates a first step in the molding of the upper latex layer for the second embodiment.

Referring now to FIG. 6, the latex in this instance is therefore poured so as to be slightly in excess of that needed for the eventual layer thickness but so that there is a relatively uniform coating over all of the respective surfaces of the mold which attach simply by adhesion in its wet state and the curing process is achieved by this drying effect.

In practice, this effect can be assisted by the addition of a first application of a dehydrating material such as methylated spirits, which by reason of its alcohol content will provide such a dehydrating effect.

The mold containing the excess liquid latex is caused to be distributed so as to more or less keep this adhering surface relatively uniformly thick and as a matter of time and temperature, such a step is continued for a sufficient period for the selected thickness of the latex as the finished upper latex layer. This selected thickness may be varied depending on the circumstances but may be at least within a range of from 1 mm to 10 mm thickness.

One of the problems that had previously been explained as existing is the characteristic of latex to develop internal directional tensions which cause the material to curl and change shape and especially where the tension provided is in unpredictable or random directions.

A first solution to this is to keep the actual thickness of the latex upper layer as thin as can be reasonably achieved while still maintaining an adequate thickness for strength purposes and this is achieved by restricting the time during which the latex with excess material in the mold is allowed to remain in the mold with such excess.

Figure 7:
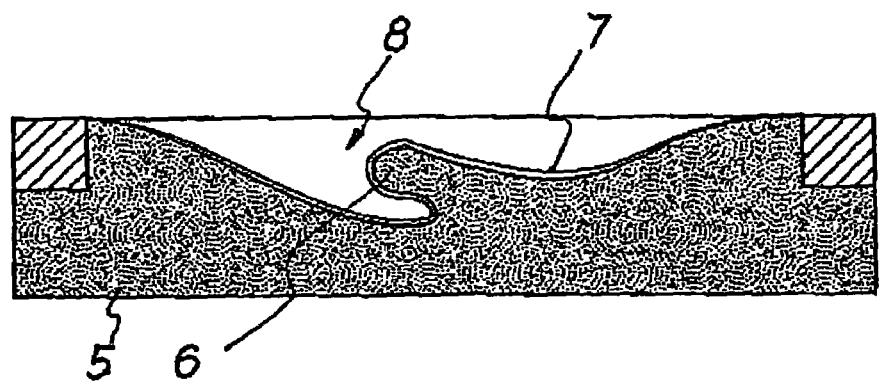
FIG. 7 illustrates the removal of excess latex so as to leave a very thin and dried surface coating which forms the upper latex layer.
Figure 8:
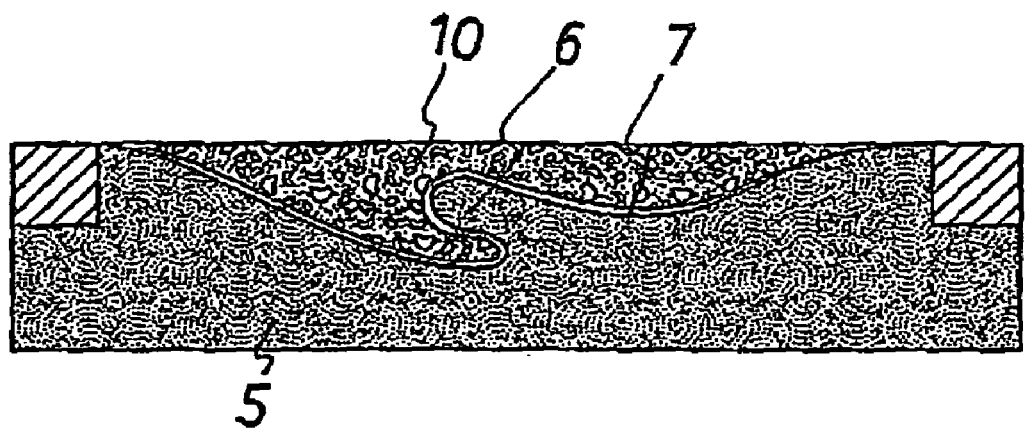
FIG. 8 illustrates the introduction of foamed plastic which when foamed and polymerised will of itself be flexible and which also will be adhering to the lowermost facial surface of the upper latex layer.
Figure 9:
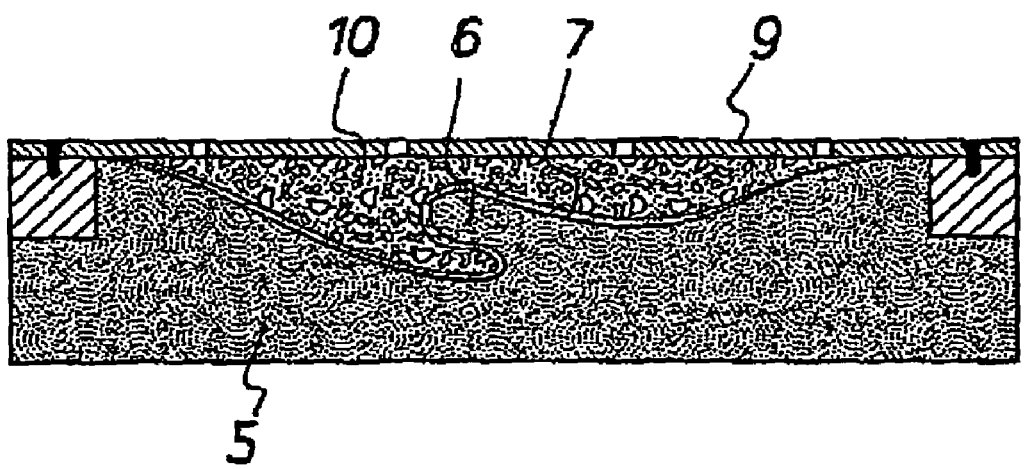
FIG. 9 illustrates the positioning of a capping on the mold so as to constrain the extent to which the foaming plastics will extend and will further provide a planar base once removed from the completed polymerised result.

Referring now to FIG. 7, once a reasonable period, perhaps five minutes, has passed which is a period which is based upon a judgement based upon experience in the circumstances, then the excess latex that has not yet been dried, is poured off and the then remaining thin film of latex 7 in the die surface is allowed to further dry expect that relatively soon after, a catalysed foaming mixture 10 of plastics monomer together with a foaming agent is inserted into the area shown at 8 and a capping 9 in this case which is a Perspex sheet with plurality of holes passing there through to allow for release of air, otherwise it might be trapped within the expanding mold foam areas is put in position. The capping 9 is in this case, screwed to a wooden frame formed into the mold 5.

Plastics materials which is also flexible and the degree of flexibility is again based upon a judgement of the degree of flexibility appropriate for removal of the thus formed material from overhangs, is then allowed to set which is achieved by simply allowing the material a sufficient time for adequate polymerisation to take place so that the shape will then be relatively established.

The resulting complex product with an upper latex surface and inner flexible foam then has surface coding supplied to the upper surface of the latex layer for instance acrylic paints or flock which is applied by adding such flock after a surface coding such as acrylic paint or other adhering material is applied as a base.

As will be seen now with this second embodiment, as with the first, these both then provide for a very excellent means by which the terrain modelling process can be significantly improved, and in practice it has shown itself to provide tremendous advantage both in the degree to which the various possible shapes including undercut shapes can now be even more faithfully and realistically reproduced while at the same time, the cost of production can be very economic and the all up weight of the resulting units can be kept very low indeed which is where war-gamers might want to transport their terrains to various locations.

The invention applies to both units manufactured in accordance with the description, the method of construction and to assemblies using such units in combination.

It also applies to the units where constructed in a regular plan shape, including hexagonal, square and triangular.

It is considered that the modelled terrain segments and the methods of production thereof, such as those described herein, would prove to be of considerable benefit to those who use modelled terrain for such purposes as war gaming, model railways, architectural models, dioramas, museum displays and so on.

The invention claimed is:

1. A terrain model element, comprising:
    a base of a foamed plastics material having adhered on an upper face thereof a shaped layer between 1 and 10 mm in thickness and providing the modelling terrain shape, the shaped layer being comprised substantially of latex;
    a catalysed foaming mixture of a plastics monomer and a foaming agent disposed above and contouring the shaped layer;
    a capping disposed directly above the catalysed foaming mixture to captively retain the catalysed foaming mixture between the shaped layer and the capping, the capping including a plurality of holes to allow for air to flow therethrough; and
    a frame attached to the base,
    wherein the capping is fastened to the frame.

2. The terrain model element of claim 1, wherein the base is sheet-like.

3. The terrain model element of claim 2, wherein the shaped layer of latex is formed so that it includes parts that are adhering to an upper surface of the base material, and other parts which are hollow and which therefore have a lowermost surface which is above and separate from an uppermost surface of the base material.

4. The terrain model element of claim 1, wherein the foamed plastics material is a flexible foam.

5. The terrain model element of claim 1, wherein the foamed plastics material adheres to the latex by reason of being directly molded onto the latex layer.

6. The terrain model element of claim 5, wherein the foamed plastics material fills or substantially fills an otherwise open cavity shape of an underneath surface of the shaped latex layer.

7. The terrain model element of claim 1, wherein the latex layer is formed and cured in a mold that will absorb moisture from the latex applied thereto.

8. The terrain model element of claim 7, wherein the mold is formed from Plaster of Paris.

9. The terrain model element of claim 1, wherein there is a coating on an upper surface of the shaped layer which is an acrylic based paint.

10. The terrain model element of claim 1, wherein the base unit is made from a urethane based foam.

11. A combination of terrain model elements, comprising: at least two terrain model elements, which are located one alongside another to provide a continuous terrain appearance, and where each of the elements is as described in claim 1.

12. The terrain model element of claim 1, wherein the upper latex layer has the plastics material molded and foamed directly on to the back or lower surface of the shaped layer.

13. The terrain model element of claim 12, wherein the foamed plastics material when foamed and cured, remains flexible.

14. The terrain model element of claim 1, wherein the shaped layer includes an undercut shape.

15. The terrain model element of claim 1, wherein the element has a plan that is hexagonal in shape.

16. The method of manufacture of claim 1, wherein the liquid latex is applied and left in the mold until a solidified layer of between 1 mm and 10 mm in thickness is formed, after which the liquid remaining is drained off.

17. The terrain model element of claim 1, wherein the frame is made of wood.

18. A method of manufacture of a terrain model element, the method comprising the steps of:

forming a mold for an upper shaped layer of the element, which is adapted to effect a moisture reducing effect, the mold including a frame;

applying liquid latex to the mold and leaving this so that at least some of the latex closest to the mold surface is caused to dry and thereby form a thin layer of solidified latex;

pouring out from the mold any excess liquid latex;

pouring a catalysed foaming mixture of a plastics monomer and a foaming agent such that the foaming mixture is disposed above and contours the shaped layer;

applying a capping directly above the catalysed foaming mixture to captively retain the catalysed foaming mixture between the shaped layer and the capping, the capping including a plurality of holes to allow for air to flow therethrough, the capping made of a flexible plastics material and the shaped layer being between 1 and 10 mm in thickness and; and attaching the capping to the frame.

19. The method of manufacture of claim 18, wherein the mold is coated with a dehydrating liquid before the liquid latex is applied.

20. The method of manufacture of claim 19, wherein the dehydrating liquid includes alcohol.

21. A terrain model element produced using the method of claim 18.

22. The method of manufacture of claim 18, wherein the frame is made of wood.

* * * * *